United States Patent
Zhu et al.

(10) Patent No.: US 10,581,853 B2
(45) Date of Patent: Mar. 3, 2020

(54) METHOD AND APPARATUS FOR PASSWORD MANAGEMENT

(71) Applicant: Huami Inc., Mountain View, CA (US)

(72) Inventors: Zhenye Zhu, Mountain View, CA (US); Xiao-feng Li, Mountain View, CA (US)

(73) Assignee: Huami Inc., Mountain View, CA (US)

( * ) Notice: Subject to any disclaimer, the term of this patent is extended or adjusted under 35 U.S.C. 154(b) by 237 days.

(21) Appl. No.: 15/227,228

(22) Filed: Aug. 3, 2016

(65) Prior Publication Data
US 2018/0041511 A1    Feb. 8, 2018

(51) Int. Cl.
*H04L 29/06*    (2006.01)
*G06F 21/31*    (2013.01)
*H04W 12/00*    (2009.01)

(52) U.S. Cl.
CPC ............ *H04L 63/10* (2013.01); *G06F 21/316* (2013.01); *H04L 63/083* (2013.01); *H04L 63/0853* (2013.01); *G06F 2221/2153* (2013.01); *H04W 12/00508* (2019.01)

(58) Field of Classification Search
CPC ........ G06K 9/6215; G06K 2009/00939; H04L 63/10; H04L 63/083; H04B 1/385
See application file for complete search history.

(56) References Cited

U.S. PATENT DOCUMENTS

| 8,813,200 B2 | 8/2014 | Zagni | |
| 9,892,576 B2 * | 2/2018 | Kursun | G07C 9/00134 |
| 2003/0174049 A1 | 9/2003 | Beigel et al. | |
| 2004/0193925 A1 | 9/2004 | Safriel | |
| 2012/0084855 A1 * | 4/2012 | Hofer | G06F 21/34 726/18 |
| 2014/0066015 A1 * | 3/2014 | Aissi | H04W 12/06 455/411 |
| 2014/0298432 A1 | 10/2014 | Brown | |

(Continued)

FOREIGN PATENT DOCUMENTS

WO    2015/014691 A1    2/2015

OTHER PUBLICATIONS

Tapan Parikh, Using Mobile Phones for Secure, Distributed Document Processing in the Developing World, 2005, IEEE CS and IEEE ComSoc, Apr.-Jun. 2005, pp. 74-81. (Year: 2005).*

(Continued)

*Primary Examiner* — Luu T Pham
*Assistant Examiner* — Edward X Long
(74) *Attorney, Agent, or Firm* — Young Basile Hanlon & MacFarlane, P.C.

(57) ABSTRACT

Systems, methods, and a security management apparatus, for password management including the determination of the identity of a service requesting a security token for access to the service. The security management apparatus generates personal identification data based on a personal identification input such as a touch selection or gesture, in order to access a service on a secured device. Responsive to the personal identification data satisfying an access criterion, a communication channel is established with the secured device. The identity of the service on the secured device is determined and a security token, such as a password, is sent to the secured device via the communication channel.

17 Claims, 7 Drawing Sheets

(56) References Cited

U.S. PATENT DOCUMENTS

| | | | | |
|---|---|---|---|---|
| 2015/0186636 A1* | 7/2015 | Tharappel | ............... | G06F 21/32 |
| | | | | 726/8 |
| 2016/0037573 A1* | 2/2016 | Ko | ........................ | H04W 76/14 |
| | | | | 455/41.2 |
| 2016/0142402 A1* | 5/2016 | Kim | ........................ | H04L 63/08 |
| | | | | 726/4 |
| 2016/0173492 A1* | 6/2016 | Han | ................... | H04L 63/0861 |
| | | | | 705/16 |
| 2017/0083909 A1* | 3/2017 | Mork | ................... | G06Q 20/401 |
| 2017/0339255 A1* | 11/2017 | Cronin | ..................... | A61B 5/00 |

OTHER PUBLICATIONS

Feiri et al., Congested-based Certificate Omission on VANETs, 2012, VANET'12, pp. 135-137. (Year: 2012).*

Li et al.; "The Emperor's New Password Manager: Security Analysis of Web-Based Password Managers"; 23rd USENIX Security Symposium. Aug. 20, 2014; 16 pages.

\* cited by examiner

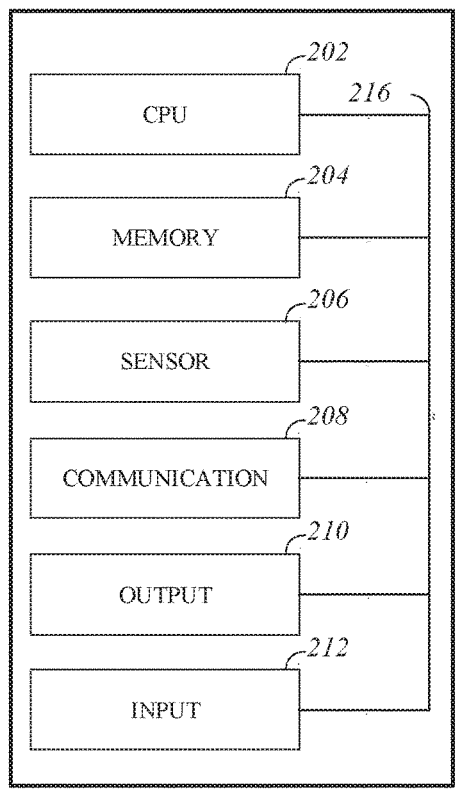
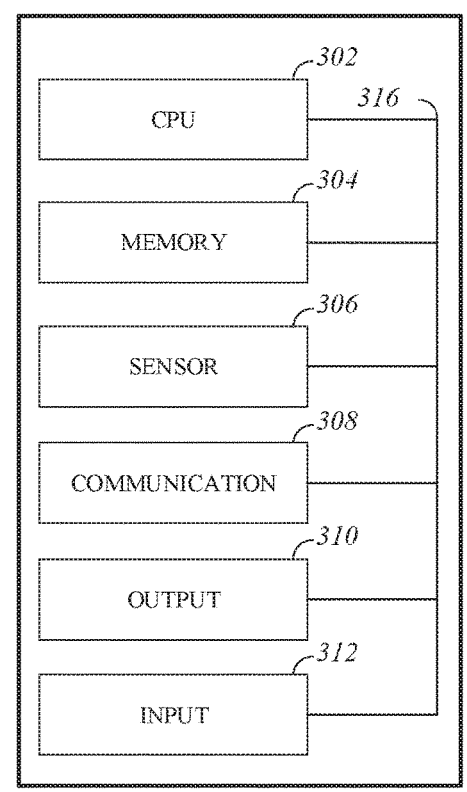
FIG. 2
FIG. 3

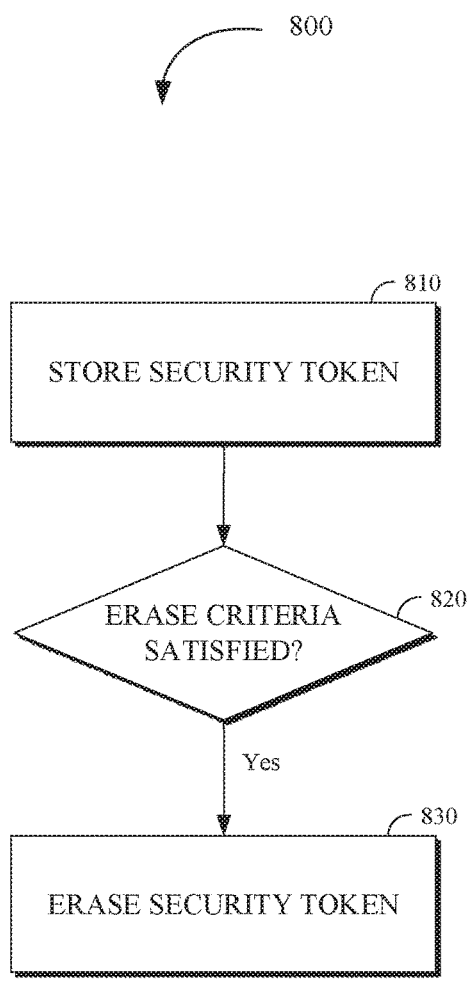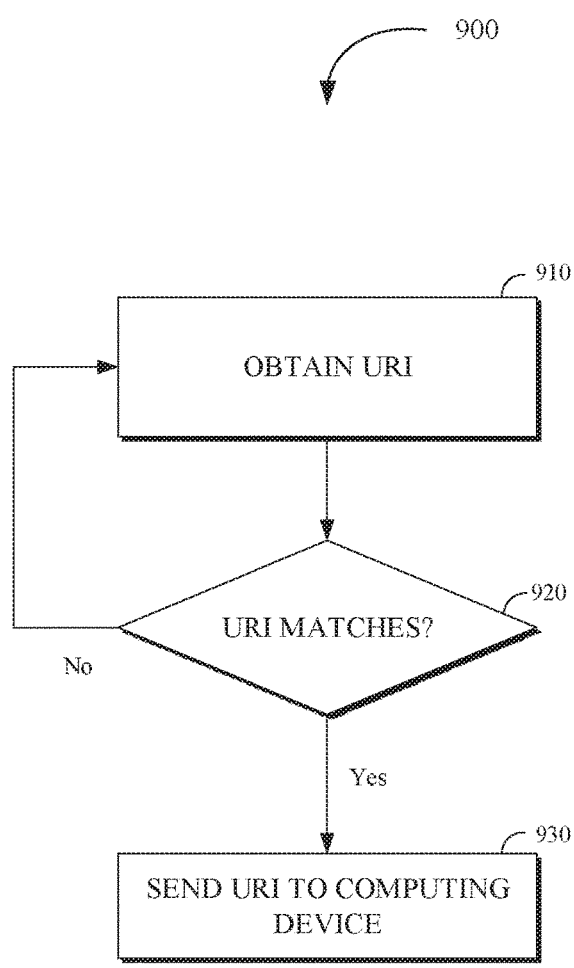
FIG. 8
FIG. 9

US 10,581,853 B2

METHOD AND APPARATUS FOR PASSWORD MANAGEMENT

TECHNICAL FIELD

The present disclosure relates in general to methods, apparatuses, and systems for security management to access secured environments.

BACKGROUND

The prevalence of electronically provided services has resulted in a dramatic increase in the number of user interactions requiring some form of authorization or authentication. These user interactions may include an exchange of information between the user and the service that the user is attempting to access, often involving some type of credential verification, such providing a password to login to the service.

Increasingly, these services are accessed not only in the traditional home computing environment on a computing device owned by the user, but outside the home, including on computing devices that are not owned by the user. Additionally, the number of services that require verification of credentials has greatly increased, thereby imposing on the user, the burden of managing an ever increasing number of passwords to access services in an ever increasing number of contexts.

SUMMARY

Disclosed herein are aspects of implementations of methods, apparatuses, and systems for security management.

In an aspect, a method for security management is provided. The method comprises: generating, by a security management apparatus, personal identification data based on a personal identification input; responsive to determining that the personal identification data satisfies an access criterion, establishing, by the security management apparatus, a communication channel with a computing device on which a service is requesting a security token; determining, by the security management apparatus, a service identity for the service based at least in part on the personal identification data; determining, by the security management apparatus, the security token that corresponds to the service identity; and sending, by the security management apparatus, the security token corresponding to the service to the computing device via the communication channel.

In another aspect, a security management apparatus is provided. The security management apparatus comprises a sensor configured to detect motion or light; a communication component configured to exchange signal data with a computing device; and a memory and a processor configured to execute instructions stored in the memory to: generate personal identification data based on a personal identification input; responsive to determining that the personal identification data satisfies an access criterion, establish a communication channel with a computing device on which a service is requesting a security token; determine a service identity for the service based at least in part on the personal identification data; determine the security token that corresponds to the service identity; and send the security token corresponding to the service to the computing device via the communication channel.

In a further aspect, a security management system is provided. The security management system comprises a computing device, and a security management apparatus comprising a sensor configured to detect motion or light, a communication component configured to exchange signal data with the computing device, a memory, and a processor configured to execute instructions stored in the memory to generate personal identification data based on a personal identification input; responsive to a determination that the personal identification data satisfies an access criterion, establish a communication channel with the computing device on which a service is requesting a security token; determine a service identity for the service based at least in part on the personal identification data; determine the security token that corresponds to the service identity; and send the security token corresponding to the service to the computing device via the communication channel.

Details of these implementations, modifications of these implementations and additional implementations are described below.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2 is a diagram of an implementation of a security management apparatus usable within implementations of the disclosure.

FIG. 3 is a diagram of an implementation of a computing device usable within implementations of the disclosure.

FIG. 8 is a flowchart showing an implementation of a method for storing and erasing a security token.

FIG. 9 is a flowchart showing an implementation of a method for determining a uniform resource identifier for a service.

DETAILED DESCRIPTION

In the past, when a small number of computing services were accessed through a small number of devices, password management was a simple task that may have involved a user recording a single password on a piece of paper or a file in the device itself. However, storing the password in such a manner imposes a security risk since the password may be plainly readable, or when the password is encrypted, there remains the risk that the device may be lost or the local storage may be damaged in some way. Further, having to manage a large number of passwords for a large number of services, that may be accessed on a large number of different devices is burdensome. Additionally, the benefits of a creating longer and more complex passwords to achieve a greater level of security is counterbalanced by the inconvenience of having to remember and enter the longer more complex password each time access to the corresponding service is required.

Various software applications or platforms may be used for password management, but the user is left with limited or no functionality once he ventures beyond the confines of the devices on which the specific application or platform is installed. Similarly, hardware approaches such as fingerprint readers may provide convenient access, but only to the devices that have been configured to accept the fingerprint, usually a personal device, that needs to be set up for the user.

Accordingly, there exists a need for a system that more effectively manages security credentials and allows a user to access secured environments in a more convenient fashion. The disclosed technology provides a more effective way to manage security tokens such as passwords in the form of a wearable device that is portable and not easily forgotten.

The methods, apparatuses, and systems of the present disclosure address ways of dealing with problems particular to the field of security management, including the use of a security management apparatus to facilitate secure access to services that require security token authorization.

Figure 1:
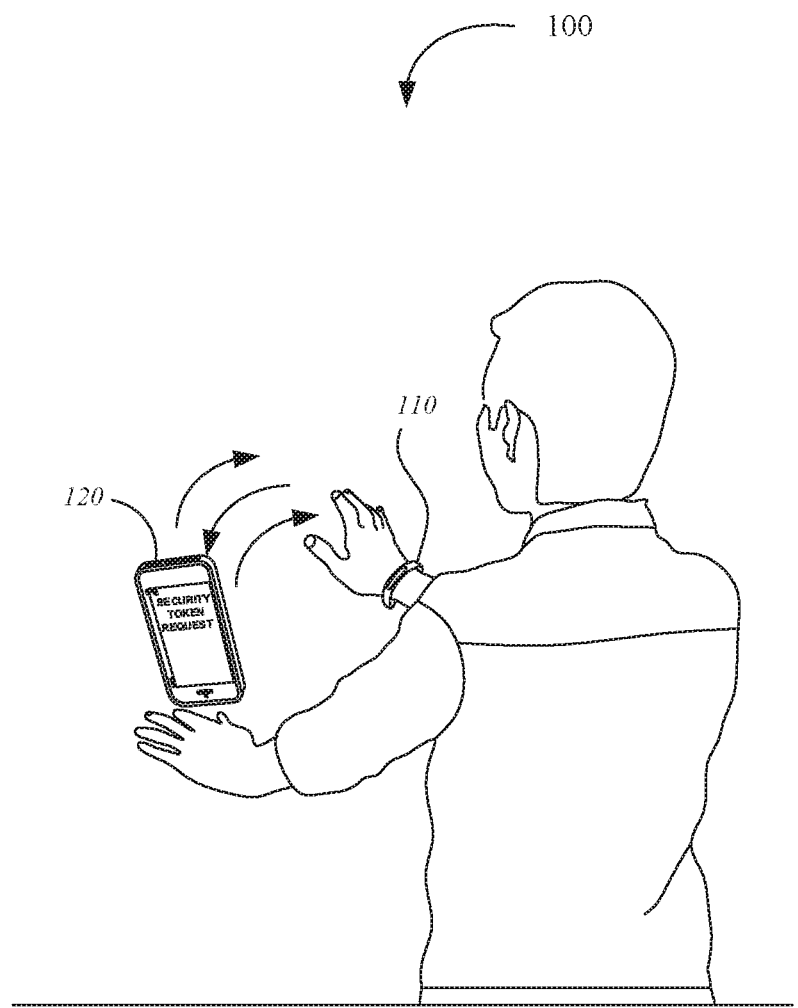
FIG. 1 is an illustration showing an implementation of a security management apparatus in use.

FIG. 1 is an illustration of a security management system in which a security management apparatus 110 is used to gain access to a service that is requesting a security token on computing device 120 which in this implementation is a mobile device. Security management apparatus 110 can be a wristband worn around a user's wrist as shown or may be another type of apparatus that is worn or carried by the user.

In an implementation, a security token includes security data which may be used for authentication or access to a resource such as a service on a computing device. In an implementation, a security token may be in the form of data, such as an alphanumeric inputs including passwords, passcodes, access identifiers, or authorization codes that may be used to access, operate, modify, or interact with resources that request authentication such as a login pages for websites or a device unlock requests from a computing device.

In an implementation a security token may correspond to a personal identification input including: alphanumeric inputs such as passwords, passcodes, or personal identification numbers (PINs); biometric inputs such as facial scans, fingerprints, voiceprints, iris scans, or galvanic skin responses; gesture inputs such as movements or sequences of movements in one or more predetermined velocities, accelerations, or directions; touch inputs including patterns of taps, presses, or swipes; or visual inputs such as optical outputs; auditory inputs.

In an implementation, a personal identification input in the form of a specific series of gestures is detected by sensors in security management apparatus 110 and personal identification data is generated based on the personal identification input. In an implementation, the personal identification data may be based on other personal identification inputs such as facial recognition, hand movements, voice inputs, or passcodes. In an implementation, the personal identification input may take the form of a passcode such as a password that may be input into security management apparatus 110 through an onscreen keyboard on a display of the security management apparatus 110.

In an implementation, the personal identification data is analyzed to determine whether the personal identification data satisfies an access criterion to unlock the security management apparatus 110 and permit the use of additional functionality in the security management apparatus 110. The security management apparatus 110 may provide an indication, such as a visual, audible, or haptic indication, when the access criterion is satisfied.

In an implementation, computing device 120 is a mobile computing device, such as a smart cellular telephone device, on which a web browser software application is operating. In an implementation, the web browser provides a visual indication that a security token, such as a passcode, is being requested in order to gain access to a secured portion of the website that is being displayed by computing device 120.

In an implementation, based on the visual indication on computing device 120, such as a displayed website requesting a security token, the user makes the specific series of gestures that correspond to writing out the letters of the security token in the air. For example, if the security token is the password "OPEN SESAME", the user could make gestures spelling out the password in the air. In an implementation, the series of gestures may be an arbitrary gesture such as spinning the security management apparatus 110 in a clockwise direction a predetermined number of times, or waving the security management apparatus 110 back and forth a predetermined number of times.

In an implementation, the personal identification data includes gesture data which corresponds to the specific series of gestures. In an implementation, the gesture data may correspond to a specific security token so that making the specific series of gestures retrieves the corresponding security token and sends the security token to computing device 120, thereby conveniently gaining access to the website that is requesting the security token.

FIG. 2 is a diagram of an implementation of a security management apparatus 200 usable within implementations of the disclosure. Security management apparatus 200 can be implemented by one or more wearable devices, such as the implementations of the security management apparatus 110 discussed with respect to FIG. 1. In an implementation, the security management apparatus includes some or all of the features of the security management apparatus 110 discussed with respect to FIG. 1. The security management apparatus 200 can be implemented in a variety of forms such as an attachment or band that can be attached or coupled to some portion of a human body. In an implementation, the form of security management apparatus 200 includes a ring, bracelet, wristband, armband, anklet, headband, belt, necklace, or other mechanism for securing security management apparatus 200 to the human body. In an implementation, the security management apparatus 200 includes some or all of the features of security management apparatus 110.

In an implementation, security management apparatus 200 comprises CPU 202, memory 204, sensor 206, and communications component 208. One example of CPU 202 is a conventional central processing unit. CPU 202 may include single or multiple processors each having single or multiple processing cores. Alternatively, CPU 202 may include another type of device, or multiple devices, capable of manipulating or processing information now-existing or hereafter developed. Although implementations of security management apparatus 200 can be practiced with a single CPU as shown, advantages in speed and efficiency may be achieved using more than one CPU. In an implementation, the communications component 208 can be coupled to CPU 202 via bus 216

Memory 204 can comprise random access memory device (RAM) or any other suitable type of storage device. Memory 204 may include executable instructions and data for immediate access by CPU 202, such as data generated and/or processed in connection with sensor 206. Memory 204 may include one or more DRAM modules such as DDR SDRAM. Alternatively, memory 204 may include another type of device, or multiple devices, capable of storing data for processing by CPU 202 now-existing or hereafter developed. CPU 202 may access and manipulate data in memory 204 via a bus such as bus 216.

Accordingly, memory 204 can store one or more applications that can include computer executable instructions that, when executed by the security management apparatus 200, cause the security management apparatus to perform actions such as converting data, analyzing data, and other actions illustrated with reference to FIGS. 5-10. In an implementation, the instructions in memory 204 may be implemented in a non-transitory computer readable storage medium such as RAM, read only memory (ROM), solid state drives, hard disk drives, flash memory, or other types of non-transitory computer readable media that may be written to or read from by a reading or writing device.

Sensor 206 can be one or more sensors disposed within or otherwise coupled to security management apparatus 200, for example, for identifying, detecting, determining, or otherwise generating signal data indicative of measurements associated with security management apparatus 200 and/or a user wearing security management apparatus 200. In an implementation, sensor 206 can comprise one or more electromyography sensors, accelerometers, cameras, light emitters, touch sensors, or the like. The accelerometers can be three-axis, six-axis, nine-axis or any other suitable accelerometers. The cameras can be RGB cameras, infrared cameras, monochromatic infrared cameras, or any other suitable cameras. The light emitters can be infrared light emitting diodes (LED), infrared lasers, or any other suitable lights. Implementations of sensor 206 can include a single sensor, one of each of the foregoing sensors, or any combination of the foregoing sensors. In an implementation, the signal data can be identified, detected, determined, or otherwise generated based on any single sensor or combination of sensors included in security management apparatus 200.

Communications component 208 can be a hardware or software component configured to communicate data (e.g., measurements, etc.) from sensor 206 to one or more external devices, such as another wearable device or a computing device, for example, as discussed above with respect to FIG. 1. In an implementation, communications component 208 comprises an active communication interface, for example, a modem, transceiver, transmitter-receiver, or the like. In an implementation, communications component 208 comprises a passive communication interface, for example, a quick response (QR) code, Bluetooth identifier, radio-frequency identification (RFID) tag, a near-field communication (NFC) tag, or the like. Implementations of communications component 308 can include a single component, one of each of the foregoing types of components, or any combination of the foregoing components.

Security management apparatus 200 can also include other components including one or more input/output devices, such as: a communications component 208; output component 210, which may be a display, haptic output device, or audio device; and input component 212 which may include a haptic input device or microphone. In an implementation, the output component 210 can be coupled to CPU 202 via a bus. In an implementation, other output devices may be included in addition to or as an alternative to the display. When the output device is or includes a display, the display may be implemented in various ways, including by a LCD, CRT, LED, OLED, etc. In an implementation, the display can be a touch screen display configured to receive touch-based input, for example, in manipulating data output to the display.

FIG. 3 is a diagram of an implementation of a computing device 300 usable within implementations of the disclosure. Computing device 300 can be implemented in connection with one or more wearable devices, such as the implementations of the wearable devices discussed above with respect to FIGS. 1 and 2. As with the CPU of FIG. 2, one example of CPU 302 is a conventional central processing unit. CPU 302 may include single or multiple processors each having single or multiple processing cores. Alternatively, CPU 302 may include another type of device, or multiple devices, capable of manipulating or processing information now-existing or hereafter developed. Although implementations of computing device 300 can be practiced with a single CPU as shown, advantages in speed and efficiency may be achieved using more than one CPU. In an implementation, computing device 300 includes some or all of the features of computing device 120.

As with the memory of FIG. 2, memory 304 can comprise RAM or any other suitable type of storage device. Memory 304 may include executable instructions and data for immediate access by CPU 302. Memory 304 may include one or more DRAM modules such as DDR SDRAM. Alternatively, memory 304 may include another type of device, or multiple devices, capable of storing data for processing by CPU 302 now-existing or hereafter developed. CPU 302 may access and manipulate data in memory 304 via bus 316.

Storage 308 can include executable instructions along with other data. Examples of executable instructions may include, for example, an operating system and one or more application programs for loading in whole or part into memory 304 and to be executed by CPU 302. The operating system may be, for example, Windows, Mac OS X, Linux, or another operating system suitable to the details of this disclosure. Storage 308 may comprise one or multiple devices and may utilize one or more types of storage, such as solid state or magnetic. Application program 310 can be executable instructions for processing signal data communicated from one or more wearable devices, determining a measurement confidence for the signal data, or both.

Computing device 300 can also include other components including one or more input/output devices, such as a communications component 308, output component 310, which may be a display, and input component 312. In an implementation, the communications component and/or display can be coupled to CPU 302 via bus 316. In an implementation, communications component 308 comprises an active communication interface, for example, a modem, transceiver, transmitter-receiver, or the like. In an implementation, the communications component can be a passive communication interface, for example, a quick response (QR) code, Bluetooth identifier, radio-frequency identification (RFID) tag, a near-field communication (NFC) tag, or the like. Implementations of the communications component can include a single component, one of each of the foregoing types of components, or any combination of the foregoing components. In an implementation, other output devices may be included in addition to or as an alternative to the display. When the output device is or includes a display, the display may be implemented in various ways, including by a LCD, CRT, LED, OLED, etc. In an implementation, the display can be a touch screen display configured to receive touch-based input, for example, in manipulating data output to the display.

Figure 4:
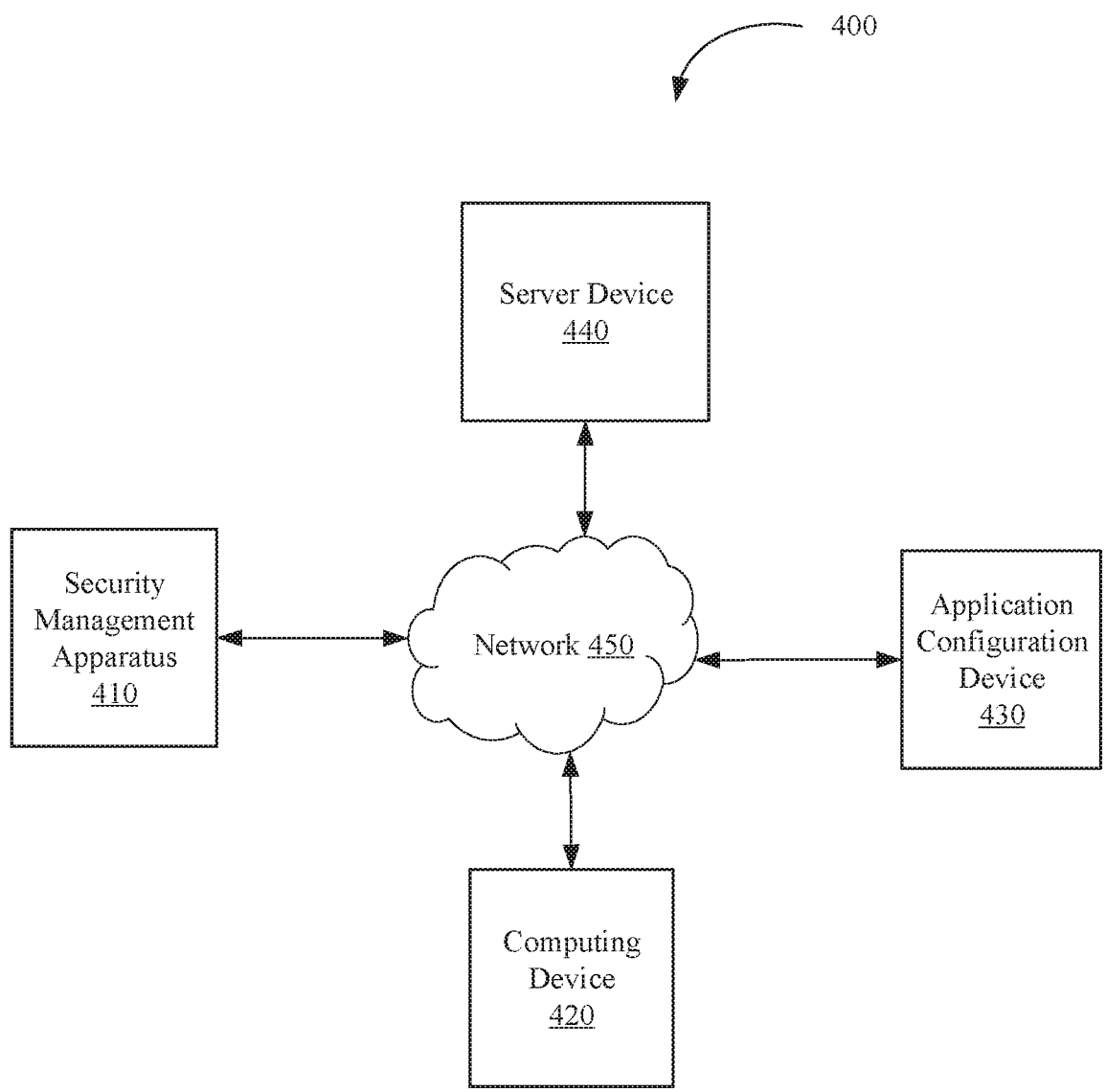
FIG. 4 is a diagram of an implementation of a user wearing a security management apparatus.

FIG. 4 is a system diagram including a network environment 400 that incorporates security management apparatus 410, which in an implementation may include the features of security management apparatus 200 illustrated in FIG. 2. In an implementation, security management apparatus 410 is coupled, via network 450, to: computing device 420, which in an implementation may include the features of computing device 420 illustrated in FIG. 2; application configuration device 430 which in an implementation may include the features of computing device 420 illustrated in FIG. 2; and server device 440 which in an implementation may include the features of a data server computing device configured to serve data to requesting client devices as well as the features of computing device 420 illustrated in FIG. 2, although the security management apparatus 410 may be coupled to other devices via other topologies.

Network 450 can be one or more communications networks of any suitable type in any combination of wired or wireless networks, including networks using Bluetooth communications, infrared communications, near field connections (NFC), local area networks (LAN), wide area networks (WAN), cellular data networks, and the Internet. Security management apparatus 410, computing device 420, and application configuration device 430 can communicate with each other via network 450. In the implementations described herein, one network 450 is shown. Where more than one security management apparatus 410 is used, each security management apparatus 410 can be connected to the same network or to different networks.

In an implementation, application configuration device 430 may be a computing device, such as computing device 420, on which application management software may be operated. In an implementation, the application management software may be operated on computing device 420. The application management software includes a locally operated or remotely operated (such as through server device 440) software application that may be used to configure security tokens, service identities, and other security related data that may be used to access a service operating on a computing device such as computing device 420.

In an implementation, the application management software may configure settings on the security management apparatus 410 including: security token storage to manage the security token and the service identity that is associated with the security token; service identities to identify a service such as a website login, operating on computing device 420; unlock options to manage the type of input or security token that may be used to unlock security management apparatus 410; or erase settings to store or erase security tokens, service identities, or other data stored on security management apparatus 410.

Figure 5:
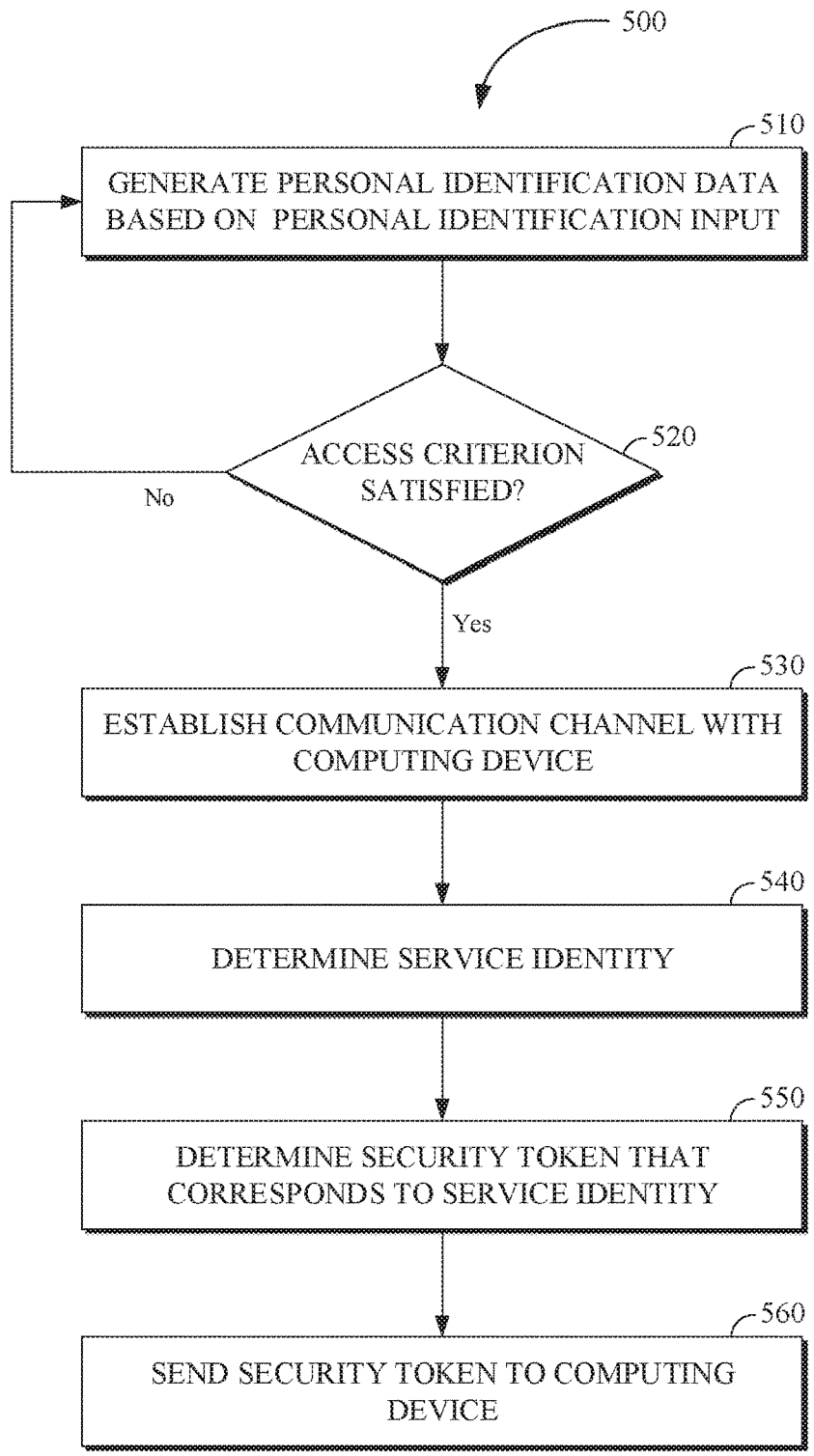
FIG. 5 is a flowchart showing an implementation of a method for security management.

FIG. 5 is a flow chart showing an implementation of a method for using a security management apparatus such as security management apparatus 200. At step 510 the security management apparatus 200 generates personal identification data based on a personal identification input. In an implementation, generating the personal identification data includes determining or identifying the state of a personal identification input, such as through sensory input from a sensor, and then determining or generating the personal identification data based on the state of the personal identification input. In an implementation, generating or determining the personal identification data includes changing, converting, or transforming the personal identification input based on the personal identification input.

In an implementation, the generation of the personal identification data includes an analog to digital conversion that generates digital data based on an analog input such as a biometric input. In an implementation, security management apparatus 200 transforms or modifies the analog input into a digital format that may be parsed by a computing device such as computing device 300.

In an implementation, the personal identification input may include an electronic inputs or sensory inputs including: alphanumeric inputs such as passwords or personal identification numbers (PINs); biometric inputs such as facial scans, fingerprints, voiceprints, iris scans, or galvanic skin responses; a gesture input such as movement or sequence of movements in one or more predetermined velocities, accelerations, or directions; a touch input including patterns of taps, presses, or swipes which may be received through a touch capture device such as a capacitive sensor or resistive sensor; a visual input such as an optical output which may be captured through an image capture device such as a camera or light sensor; an auditory input such as a sound that may be captured by a sound capture device such as a microphone; an infrared light input; or an electromagnetic signal such as a radio wave which may be used as a non-transitory medium for transmitting or receiving data that can be read by a computing device.

In an implementation, security management apparatus 200 may detect the personal identification input based on input from a sensor such as sensor 206. In an implementation, the generation of the personal identification data based on the personal identification input may include conversion or transformation of an analog input, such as the personal identification input, into a digital output, such as the personal identification data, which may be performed through analog to digital conversion or transformation. In an implementation, the conversion or transformation of the analog input into the digital input may include filtering of the analog input, such as the personal identification input, to optimize the digital output, such as the personal identification data.

In an implementation, the personal identification data may be associated with security data that is accessible through or stored in the security management apparatus 200. In an implementation, the security data may include: user identifier data that identifies the user of the security management apparatus 200; service identity data that includes one or more service identities to identify a service, such as a software application, that may operate on a computing device; access data such as a code that may be used to gain access to a computing device or service that operates on a computing device; security token data including one or more security tokens that may be used to access, operate, modify, or interact with a service operating on a computing device, such as a software service; gesture data including one or more gestures corresponding to the velocity, acceleration, or direction of a personal identification input; or device identifier data that may be used to identify a computing device including the security management apparatus 200.

In an implementation, generating the personal identification data based on the personal identification input includes generating gesture data based at least in part on one or more gestures including the velocity, acceleration, or direction of the personal identification input over a predetermined time period. In an implementation, the gesture data may be associated with the security data such as the service identity data or the security token data.

In an implementation, the personal identification data may be stored or accessed locally on the security management apparatus 200 or stored remotely on a remote device such as server 440, illustrated in FIG. 4.

At step 520, the security management apparatus 200 determines whether the personal identification data satisfies an access criterion. In an implementation, satisfying the access criterion may include comparing the personal identification data to access data in order to determine whether the personal identification data corresponds to or matches at least a portion of the access data. The determination of whether the access criterion was satisfied may be performed locally at security management apparatus 200, performed remotely on a remote device such as on server device 440, or performed on a combination of the security management apparatus 200 and the remote device.

In an implementation, the security management apparatus 200 sends the personal identification data to one or more remote devices such as server device 440, which may be accessed through a network such as network 450 illustrated in FIG. 4. In an implementation, all or part of the access data may be stored locally on the security management apparatus 200, stored remotely on a remote device such as server 440, or in a combination of the security management apparatus 200 and the remote device.

In an implementation, responsive to determining that the personal identification input has been received a predetermined number of times without satisfying the access criterion, the security management apparatus 200 may perform one or more access restriction actions. In an implementation, the one or more access restriction actions include delaying the generation of the personal identification data based on the personal identification input for a predetermined period of time, or erasing the security data. In an implementation, erasing the security data includes erasing the locally stored security data in security management apparatus 200 or sending a signal to erase security data that is remotely stored on a remote device such as server device 440.

In an implementation, satisfying the access criterion includes security management apparatus 200 receiving access criterion confirmation to indicate that the personal identification data corresponds to the access data and that the security management apparatus 200 satisfies the access criterion. Responsive to determining that the access criterion is satisfied, the Yes branch is taken to step 530. Responsive to determining that the access criterion is not satisfied, the No branch is taken to step 510.

At step 530, responsive to determining that the access criterion is satisfied, the security management apparatus 200 detects a computing device 300 that is within its operational range and establishes a communication channel with the computing device 300 on which a service is requesting a security token. The communication channel may be used to transmit or receive data between security management apparatus 200 and the computing device 300.

In an implementation, the communication channel includes a wired communication channel or wireless communication channel that may be used to transmit or receive data through communication channels such as Ethernet, Wi-Fi, Bluetooth, radio frequency, near field communication (NFC), code division multiple access (CDMA), global system for mobile communications (GSM), or long-term evolution (LTE). In an implementation, the security management apparatus 200 may encrypt or decrypt all or part of the data that is sent or received through the communication channel.

In step 540, the security management apparatus 200 determines a service identity for the service that is requesting the security token. In an implementation, determination of the service identity is based at least in part on the personal identification data which may include service identity data that includes one or more service identities such as a service identity that identifies the service operating on computing device 300. In an implementation, the determination of the service identity may be based on gesture data, such as the gesture data that may be generated in step 510, and which may be associated with a service identity.

Figure 6:
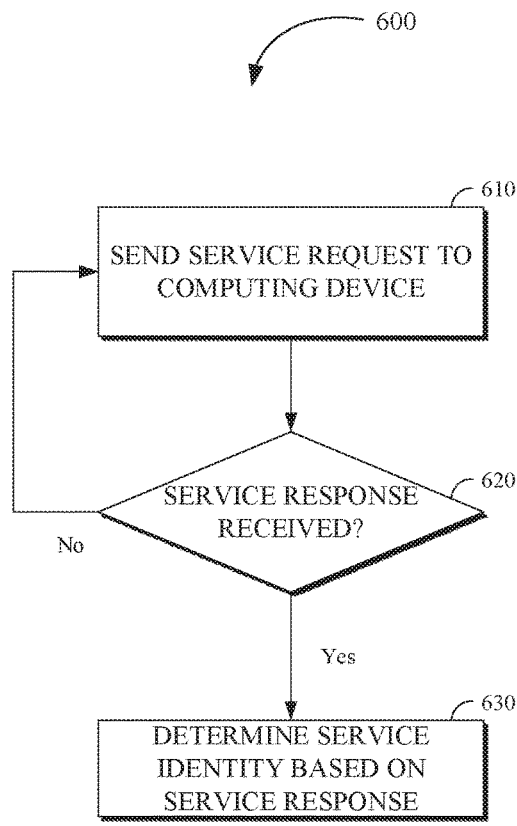
FIG. 6 is a flowchart showing an implementation of a method for determining a service identity based on a service identifier request.
Figure 7:
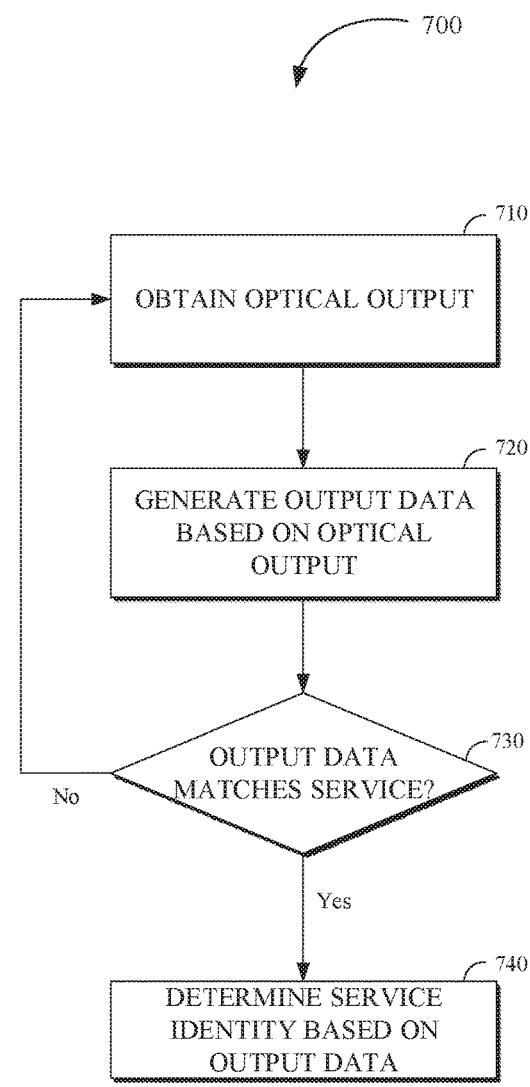
FIG. 7 is a flowchart showing an implementation of a method for determining a service identity based on an optical output.

In an implementation, the determination of the service identity may be based on a service identity request as in method 600 that is illustrated in FIG. 6 or on an output from computing device 300 as in method 700 that is illustrated in FIG. 7. In an implementation, when personal identification data is received in addition to detecting an output by computing device 300, or receiving a response to a service identifier request, the security management apparatus 200 may accept only one of the received inputs or detected output, the first one of the input that is received or the output that is detected, or ignore the received input or detected output.

In an implementation, when determination of the identity of the service is based on the personal identification data, the personal identification data corresponding to the personal identification input is associated a service identity corresponding to a service such as the service operating on computing device 300. The correspondence between the personal identification data and the service identity may be determined through comparison and matching of the personal identification data to a listing of service identities. In an implementation, the comparison and matching may be performed through a look-up table, although other ways of correlating the personal identification data to a service may be used. In an implementation the listing of service identities includes services that were previously stored together with associated identifying information for such as the uniform resource identifiers including uniform resource locators (URLs).

At step 550, the security management computing device 200 determines a security token that corresponds to the service identity. In an implementation, the security token corresponding to the identity of the service may be determined using a comparison and matching of service identities to security tokens such as in a lookup table. In an implementation, determination of the security token includes retrieval of the security token that is performed by security management apparatus 200 sending a security token request to a server device such as server device 440, which may provide a response to the security token request that includes the security token. In an implementation, the determination of the security token may be based on gesture data, such as the gesture data that may be generated in step 510 and which may be associated with a security token.

In an implementation the security token request may be in the form of a signal that transmits data to a remote device such as server device 440, either directly or indirectly. In an implementation, the security token request sent to server device 440 may be encrypted, thereby providing more secure communication with the server device.

In an implementation, the security token includes any type of data or input that may be used to access, operate, modify, or interact with the service. In an implementation the security token includes data corresponding to one of the personal identification inputs including passcode data such as a password; biometric data; gesture input data; touch data; visual data; or auditory data. In an implementation, all or part of the security token may be stored or accessed locally on the security management apparatus 200, remotely on a remote device such as server 440, or in a combination of the security management apparatus 200 and the remote device.

At step 560, after receiving the security token, the security management apparatus 200 sends the security token to the computing device 300. In an implementation, the security token is sent via the communication channel established between security management apparatus 200 and computing device. In an implementation, all or parts of the security token may be encrypted before sending. In an implementation, all or parts of the security token may be transmitted via other communication channels that are established between security management apparatus 200 and computing device 300.

FIG. 6 is a flow chart illustrating method 600, in which a service identity is determined consistent with step 540 in method 500 as illustrated in FIG. 5. At step 610, the security management apparatus 200 sends a service identifier request to the computing device 300. The service identifier request includes a request for the identity of the service that is operating on the computing device 300. The identity of the service may include the name of the service, a version of the service, a URI associated with the service, and other types of identifying information associated with the service.

In an implementation, the service identifier request may be sent to a remote device such as server device 440, which may communicate with security management apparatus 200 or computing device 300 to determine the identity of the service that is operating on computing device 300. In an implementation, the service identifier request, when sent to a remote device, such as server 440, may include a security token request, for the security token corresponding to the service identity in the service identifier request. In an implementation, the service identifier request or the response to the service identifier request may be encrypted.

At step 620, the security management apparatus 200 waits for a response to the service identifier request. In an implementation, the response to the service identifier request includes the identity of the service that is operating on the computing device 300. When security management apparatus 200 receives a response to the service identifier request the Yes branch is taken to step 630. When no response to the service identifier request is received, the No branch is taken to step 610.

At step 630, when security management apparatus 200 determines that the response to the service identifier request is valid, then the service identity is based on the response to the service identifier request. In an implementation, the determination of whether the response to the service identifier request is valid is based on whether the service identifier request conforms to validity criteria including a minimum file size, maximum file size, checksum, or other data verification technique. In an implementation, the determination of the service identity in step 540 in method 500 may be partly or wholly based on the determination in step 630.

FIG. 7 is a flow chart illustrating method 700, which shows the determination of service identity based on an optical output consistent with step 540 in method 500 illustrated in FIG. 5.

At step 710, the security management apparatus 200, which includes sensor 206, obtains an output from computing device 300. In an implementation, the output includes optical outputs, auditory outputs, electromagnetic outputs, or haptic outputs. In an implementation, the output may be detected and obtained through a sensor such as sensor 206. In an implementation, the output is an optical output that is obtained through a camera, although other types of sensors such as microphones, may be used to detect the optical output. In an implementation, the security management apparatus may detect other types of outputs from the computing device, such as signals that may correspond to a service that is operating on the computing device.

At step 720, security management apparatus 200 generates optical output data based on an optical output. In an implementation, the generation of the optical output data based on the optical output may include image enhancement, or optical character recognition (OCR). Enhancing the optical output may result in improved discrimination of the optical output and more accurate optical character recognition.

At step 730, security management apparatus 200 compares the optical data to service image data. In an implementation, the service image data includes one or more service images that are associated with a service that can operate on the computing device. In an implementation, the one or more service images include images of the service in various contexts, such as web page images, images of the service being operated within an application, or text images associated with a service identifier such as images of a uniform resource identifier or logo that is associated with the service. When the optical output data corresponds to at least one of the one or more service images in the service image data, the Yes branch is taken to step 540, where the optical output data is determined to match the service identity associated with the service image. In an implementation, the determination of the service identity in step 540 in method 500 may be partly or wholly based on the determination in step 740.

When the optical output data does not match any of the service images, the No branch is taken to step 710.

FIG. 8 is a flow chart illustrating method 800, which shows a method of storing and erasing security tokens that is consistent with method 500 and step 550 illustrated in FIG. 5.

At step 810, after determining the security token that corresponds to the service identity, the security management apparatus 200 stores the service identity and the security token corresponding to the service identity service. In an implementation, the service identity or security token may be stored locally, such as in memory module 204. In an implementation, security management apparatus 200 may send a signal to a remote server device such as server 440, and store the service identity or corresponding security token in the remote server. In an implementation, the security token or service identity may be encrypted before being stored locally or sent to the remote server device.

In operation 820, the security management apparatus 200 manages the stored security tokens and service identities by erasing the service identity and the corresponding security token based on one or more erase criteria being satisfied. In an implementation, the security management apparatus 200 may erase the security token upon: receiving an erase command, receiving the personal identification input a predetermined number of times in a first predetermined period of time without satisfying the access criterion, a second predetermined period of time elapsing after sending the security token to the computing device, or a third predetermined period of time elapsing without receiving a personal identification input. When none of the erase criteria is satisfied, the security management apparatus 200 waits for one of the criteria to be satisfied, or in an alternative implementation, method 800 ends. When at least one of the security token criteria is satisfied, the Yes branch is taken to step 595.

At step 830, in response to one of the security token criteria being satisfied, one or more of the stored security tokens or service identities are erased, such as deletion from memory module 204. In an implementation, some or all of the stored security tokens or service identities may be erased from the local memory or an erase signal may be sent to a remote device such as server 440, which may store the security tokens or service identities.

FIG. 9 illustrates a method 900, for matching a uniform resource identifier (URI) to a service identity that is consistent with the determination of a service identity described in method 500 at step 540 and illustrated in FIG. 5.

At step 910, the security management apparatus 200, obtains a URI corresponding to an output, such as the optical output obtained described in step 710. In an implementation, the URI may be manually entered into security management apparatus 200, such as through input 212 or sensor 206. In an implementation, the URI may be obtained through a different type of output such as a sound or signal transmitted from computing device 300. In an implementation, when a URI is not obtained within a predetermined period of time, security management apparatus 200 provides an indication that a URI is not available and may end method 900.

At step 920, the security management apparatus 200, based on the service identity, determined at step 540, determines whether one or more uniform resource identifiers (URIs) correspond to the service identity. In an implementation, determining the one or more URIs that correspond to the service identity may be performed by matching the service identity to a URI in a URI database which may include one or more database tables, such as lookup tables, that include service identities and corresponding URIs. In an implementation, the URIs include uniform resource locators (URLs), uniform resource names (URNs), and other URIs that may be used to determine a resource on a computing device such as computing device 300. Responsive to determining that one or more of the URIs corresponds to the service identity, the Yes branch is taken to step 930. Responsive to determining that one or more URIs does not correspond to the service identity, the No branch is taken to step 910.

In an implementation, when none of the one or more URIs correspond to a service identity, the security management apparatus 200 may provide an indication, such as a visual or audible warning that the obtained URI does not correspond to a known URI. In an implementation, the security management apparatus 200 stores a white list of permitted URIs and a blacklist of unapproved URIs and generate a specific indication, such as a specific audible or visual indication, that the corresponding URI is permitted or unapproved.

At step 930, the security management apparatus sends the URI that corresponds to the service identity, to the computing device through the communication channel described in step 560. In an implementation, a separate communication channel with computing device 300 may be established by security management apparatus 200, and the URI may be sent using a HID protocol.

In this way, by sending a URI to the computing device 300, the resource associated with the service may be directly accessed. In an implementation, in which the URI is a URL, instead of sending the security token to a URI a spoofed website that has been designed to appear like, or have a similar URL as the legitimate website associated with the service identity, a URL is sent to the browser operating on computing device 300 and the legitimate website to which the security token should be directed is opened.

Figure 10:
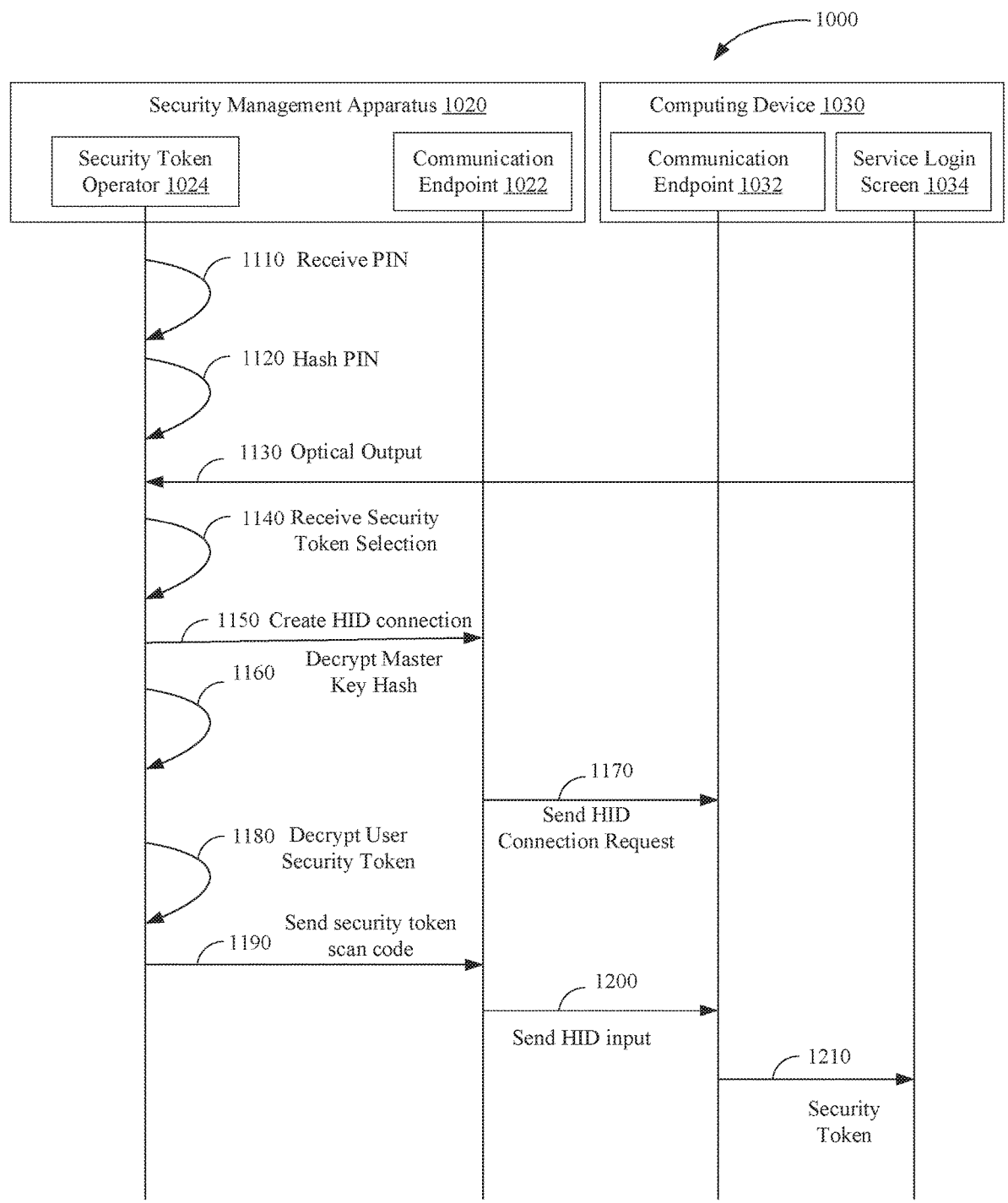
FIG. 10 is a timing diagram showing an implementation of a method for using sensors in the security management apparatus to determine a service that is operating on a computing device.

FIG. 10 is a timing diagram illustrating an interaction between a security management apparatus 1020 and computing device 1030. In an implementation, security management apparatus 1020 includes a communication endpoint 1022, a security token operator 1024, and some or all of the features of security management apparatus 200.

In an implementation, computing device 1030 includes communication endpoint 1032, service login screen 1034, and some or all of the features of computing device 300. Communication endpoint 1022 and communication endpoint 1032 are able to transmit and receive signals, includes a device profile, such as an HID device profile, and includes one or more communication endpoints that provide some or all of the features of communication components 208.

In an implementation, security token operator includes an application, such as a software application that is able to execute instructions such as receiving inputs, hashing data, encrypting data, decrypting data, and establishing connections with computing devices.

At step 1110, a communication endpoint 1022 in security management apparatus 1020, receives a personal identification input in the form of a personal identification number (PIN). In an implementation, the communication endpoint is a touch screen device that is coupled to security management apparatus 1022 and which is able to receive touch inputs and display information.

At step 1120, personal identification data is generated by hashing the PIN and the personal identification data may be used to determine that the security management apparatus 1020, which was locked, will be unlocked to enable further interaction with the security management apparatus 1020.

At step 1130, a camera in security management device receives an optical output from the service login screen 1034 in computing device 1030. In an implementation, the service login screen 1034 is a display device which displays a website that is requesting login information. In an implementation, the optical output may be used to determine the identity of the website requesting the service by using image capture or image recognition techniques such as optical character recognition.

At step 1140, security management apparatus 1020 receives a security token selection input on communication endpoint 1022. In an implementation, the communication endpoint 1022 includes a touch display device that is able to display a selection of service identities and receive a touch input to confirm selection of the corresponding service identity. In an implementation, the service identities may be displayed in the form of text, images such as icons, or a combination of text and images.

At step 1150, security token operator sends a signal to communication endpoint 1022, in order to establish a connection, such as a human interface device (HID) connection, with computing device 1030, to send and receive data through the HID connection. In an implementation, other types of connections may be established by security token operator 1024, including connections that are able to receive and transmit inputs from an interface that receives touch input, sound input, optical input, or any personal identification input as described in FIG. 5.

At step 1160, the security token operator 1024 decrypts a master key hash that includes data relating to service identities and corresponding security tokens. In an implementation, the master key hash is encrypted using an encryption protocol such as Advanced Encryption Standard (AES).

At step 1170, communication endpoint 1022 sends an HID connection request to communication endpoint 1032 in computing device 1030. In an implementation, communication endpoint 1022 may send a connection request to establish a non-HID connection that transmits or receives inputs from an input device.

At step 1180, security token operator decrypts a user security token, stored in security management apparatus 1020, that corresponds to the security token selection at step 1140. In an implementation, the security token corresponds to the optical output at step 1130.

At step 1190, security token operator 1024, sends the security token scan code to communication endpoint 1022. In an implementation, the security token scan code includes the decrypted security token and a HID input corresponding to the security token.

At step 1200, communication endpoint 1022 sends a HID input, based on the security token scan code, to the communication endpoint 1032. In an implementation, the HID input is sent through a wireless connection such as Bluetooth, and may be sent through an encrypted communication channel to improve security.

At step 1210, the service login screen 1034 provides an indication that the HID input, comprising the security token, was received by computing device. In an implementation, the indication may include a visual, auditory, or haptic indication that the security token was received.

The disclosed technology offers the advantages of a security management apparatus that facilitates access to secured computing environments while maintaining a high level of security to the user. In addition to facilitating access in a secure manner, the disclosed technology, when used in a security management system, provides the ability to backup security tokens in a remote server, such as in a cloud computing environment.

Because the security management apparatus does not require pre-installation of software on a device, and is able to directly communicate with a computing device while acting as a human interface device such as a keyboard, the user is able to realize the benefits of both improved convenience and ubiquitous access. Further, by maintaining relevant service identity data, such as URIs associated with a service identity, the disclosed technology is able to prevent or reduce unauthorized access resulting from spoofed websites and other techniques used to compromise secured environments.

While the foregoing disclosure shows a number of illustrative implementations, it will be apparent to those skilled in the art that various changes and modifications can be made herein without departing from the scope of the disclosure as defined by the appended claims. Accordingly, the disclosed implementations are representative of the subject matter which is broadly contemplated by the present disclosure, and the scope of the present disclosure fully encompasses other embodiments which may become obvious to those skilled in the art, and that the scope of the present disclosure is accordingly to be limited by nothing other than the appended claims.

All structural and functional equivalents to the elements of the above-described implementations that are known or later come to be known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Furthermore, although elements of the disclosure may be described or claimed in the singular, reference to an element in the singular is not intended to mean "one and only one" unless explicitly so stated, but shall mean "one or more." Additionally, ordinarily skilled artisans will recognize in view of the present disclosure that while operational sequences must be set forth in some specific order for the purpose of explanation and claiming, the present disclosure contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Further, any routines, platforms, or other functionality as disclosed herein associated with or implemented as software may be performed by software modules comprising instructions executable by a process for performing the respective routine, platform, or other functionality.

The foregoing description describes only some examples of implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely by example, and not mandatory; functions performed by a single system component may instead be performed by multiple components, and functions performed by multiple components may instead performed by a single component.

It is to be understood that the present disclosure is not to be limited to the disclosed implementations but, on the contrary, is intended to cover various modifications and equivalent arrangements included within the scope of the appended claims.

What is claimed is:

1. A method for security management, the method comprising:
   receiving, from a user of a security management apparatus, personal identification input used by the security management apparatus to unlock the security management apparatus;
   generating, by the security management apparatus, personal identification data based on the personal identification input;
   comparing, by the security management apparatus, the personal identification data against at least a portion of stored access data; and
   unlocking the security management apparatus in response to determining that the personal identification data satisfies an access criterion, and performing operations comprising:
      detecting, by the security management apparatus, a computing device within an operational range of the security management apparatus;
      establishing, by the security management apparatus, a communication channel with the computing device on which a service is requesting a security token, wherein the security management apparatus establishes the communication channel with the computing device to send the security token from the security management apparatus to the computing device;
      determining, by the security management apparatus, a service identity for the service based at least in part on the personal identification data by steps comprising:
         obtaining using a camera of the security management apparatus, optical output from the computing device, wherein the optical output is obtained using the camera while the optical output is displayed by the computing device;
         generating, by the security management apparatus, optical output data based on the optical output; and
         comparing, by the security management apparatus, the optical output data to service identity data including a plurality of the service identities, wherein the determining the service identity is further based on the comparison;
      determining, by the security management apparatus, a Uniform Resource Identifier (URI) that corresponds to the service identity;
      sending, by the security management apparatus, the URI to the computing device via the communication channel,
         wherein the URI is sent to the computing device before the security token,
         wherein the computing device uses the URI to provide the service, and
         wherein sending the URI to the computing device does not comprise accessing contents of the URI by the security management apparatus;
      determining, by the security management apparatus, the security token that corresponds to the service identity, wherein the security management apparatus decrypts the security token stored in the security management apparatus; and
      sending, by the security management apparatus, the security token corresponding to the service to the computing device via the communication channel,
   wherein the determining that the personal identification data satisfies the access criterion is done prior to establishing the communication channel with the computing device, and
   wherein the computing device provides access to the service requesting the security token and is distinct from the security management apparatus.

2. The method of claim 1, the operations further comprising:
   sending, by the security management apparatus, a service identifier request to the computing device; and
   receiving, by the security management apparatus, a service identifier in response to the service identifier request, wherein the service identity is further based on the service identifier.

3. The method of claim 1, the operations further comprising:
   detecting, by the security management apparatus, an output from the computing device, wherein the service identity is further based on the output.

4. The method of claim 1, wherein the determining the security token further comprises:
   sending, by the security management apparatus, a security token request to a remote server device, wherein the security token request is based at least in part on the service identity; and
   receiving, by the security management apparatus, security token data in response to the security token request, wherein the determining the security token is based at least in part on the security token data.

5. The method of claim 1, the operations further comprising:
   responsive to determining that the security token satisfies the request for a security token by the service on the computing device, storing, by the security management apparatus, the security token; and
   responsive to an occurrence of one or more erase conditions, erasing, by the security management apparatus, the security token, wherein the one or more erase conditions include receiving an erase command, receiving the personal identification input a predetermined number of times in a first predetermined period of time without satisfying the access criterion, a second predetermined period of time elapsing after the sending the security token to the computing device, or a third predetermined period of time elapsing without receiving the personal identification input.

6. The method of claim 1, wherein the personal identification input includes an alphanumeric input, a biometric input, a gesture, a touch input, a visual input, an auditory input, an infrared light, or an electromagnetic signal.

7. The method of claim 1, further comprising:
   responsive to determining that the personal identification input is received a predetermined number of times without satisfying the access criterion, delaying, by the security management apparatus, the generation of the personal identification data for a predetermined period of time.

8. The method of claim 1, the operations further comprising:
   generating, by the security management apparatus, gesture data based at least in part on one or more gestures including velocity, acceleration, or direction of the personal identification input over a predetermined time period, wherein the service identity is further based on the gesture data.

9. A security management apparatus, comprising:
a sensor configured to detect motion or light;
a communication component configured to exchange signal data with a computing device; and
a memory and a processor configured to execute instructions stored in the memory to:
generate personal identification data based on a personal identification input; and
unlock the security management apparatus in response to a determination that the personal identification data satisfies an access criterion, and perform operations comprising operations to:
detect, by the security management apparatus, the computing device within an operational range of the security management apparatus;
establish a communication channel with the computing device on which a service is requesting a security token, wherein the apparatus establishes the communication channel with the computing device to send the security token from the apparatus to the computing device;
determine a service identity for the service based at least in part on the personal identification data, wherein to determine the service identity comprises to:
obtain using a camera of the security management apparatus, optical output from the computing device, wherein the optical output is obtained using the camera while the optical output is displayed by the computing device;
generate, by the security management apparatus, optical output data based on the optical output;
compare, by the security management apparatus, the optical output data to service identity data including a plurality of service identities, wherein the determining the service identity is further based on the comparison;
determine, by the security management apparatus, a Uniform Resource Identifier (URI) that corresponds to the service identity; and
send, by the security management apparatus, the URI to the computing device via the communication channel,
wherein the URI is sent to the computing device before the security token,
wherein the computing device uses the URI to provide the service, and
wherein sending the URI to the computing device does not comprise accessing contents of the URI by the security management apparatus;
determine the security token that corresponds to the service identity, wherein the security management apparatus decrypts the security token stored in the security management apparatus; and
send the security token corresponding to the service to the computing device via the communication channel,
wherein the determination that the personal identification data satisfies the access criterion is done prior to establishing the communication channel with the computing device, and
wherein the computing device provides access to the service requesting the security token and is distinct from the security management apparatus.

10. The apparatus of claim 9, wherein the operations further comprise operations to:

send a service identifier request to the computing device; and
receive a service identifier in response to the service identifier request, wherein the service identity is further based on the service identifier.

11. The apparatus of claim 9, wherein the operations further comprise operations to:
detect an output from the computing device, wherein the service identity is further based on the output.

12. The apparatus of claim 9, wherein the determining the security token further comprises:
send a security token request to a remote server device, wherein the security token request is based at least in part on the service identity; and
receive security token data in response to the security token request, wherein the determining the security token is based at least in part on the security token data.

13. The apparatus of claim 9, wherein the operations further comprise operations to:
responsive to determining that the security token satisfies the request for a security token by the service on the computing device, store the security token; and
responsive to an occurrence of one or more erase conditions, erase the security token, wherein the one or more erase conditions include receiving an erase command, receiving the personal identification input a predetermined number of times in a first predetermined period of time without satisfying the access criterion, a second predetermined period of time elapsing after the sending the security token to the computing device, or a third predetermined period of time elapsing without receiving the personal identification input.

14. The apparatus of claim 9, wherein the personal identification input includes an alphanumeric input, a biometric input, a gesture, a touch input, a visual input, an auditory input, an infrared light, or an electromagnetic signal.

15. The apparatus of claim 9, wherein the processor is further configured to execute instructions stored in the memory to:
responsive to determining that the personal identification input is received a predetermined number of times without satisfying the access criterion, delay the generation of the personal identification data for a predetermined period of time.

16. The apparatus of claim 9, wherein the operations further comprise operations to:
generate gesture data based at least in part on one or more gestures including velocity, acceleration, or direction of the personal identification input over a predetermined time period, wherein the service identity is further based on the gesture data.

17. A security management system, comprising:
a computing device providing access to a service requesting a security token; and
a security management apparatus comprising a sensor configured to detect motion or light, a communication component configured to exchange signal data with the computing device, a memory, and a processor configured to execute instructions stored in the memory to:
generate personal identification data based on a personal identification input; and
unlock the security management apparatus in response to a determination, by the security management system, that the personal identification data satisfies an access criterion and perform operations comprising operations to:

detect, by the security management apparatus, the computing device within an operational range of the security management apparatus;

establish a communication channel with the computing device on which the service is requesting the security token, wherein the apparatus establishes the communication channel with the computing device to send the security token from the security management apparatus to the computing device;

determine a service identity for the service based at least in part on the personal identification data;

obtain using a camera of the security management apparatus, optical output from the computing device, wherein the optical output is obtained using the camera while the optical output is displayed by the computing device;

generate, by the security management apparatus, optical output data based on the optical output;

compare, by the security management apparatus, the optical output data to service identity data including a plurality of service identities, wherein the determining the service identity is further based on the comparison;

determine a Uniform Resource Identifier (URI) that corresponds to the service identity; and send the URI to the computing device via the communication channel,
 wherein the URI is sent before the security token,
 wherein the computing device uses the URI to provide the service, and
 wherein sending the URI to the computing device does not comprise accessing contents of the URI;

determine the security token that corresponds to the service identity, wherein the security management apparatus decrypts the security token stored in the security management apparatus; and send the security token corresponding to the service to the computing device via the communication channel, wherein the determination that the personal identification data satisfies the access criterion is done prior to establishing the communication channel with the computing device, and wherein the computing device provides access to the service requesting the security token and is distinct from the security management apparatus.

* * * * *